United States Patent
Hartnack et al.

(10) Patent No.: US 7,800,003 B2
(45) Date of Patent: Sep. 21, 2010

(54) INSULATOR WITH ENHANCED INSULATING CAPACITY

(75) Inventors: Herbert Hartnack, Erlangen (DE); Igor Mehltretter, Buckenhof (DE)

(73) Assignee: Siemens Aktiengesellschaft, Munich (DE)

( * ) Notice: Subject to any disclaimer, the term of this patent is extended or adjusted under 35 U.S.C. 154(b) by 373 days.

(21) Appl. No.: 11/989,213

(22) PCT Filed: Jul. 24, 2006

(86) PCT No.: PCT/EP2006/064562
§ 371 (c)(1),
(2), (4) Date: Jan. 22, 2008

(87) PCT Pub. No.: WO2007/012627
PCT Pub. Date: Feb. 1, 2007

(65) Prior Publication Data
US 2009/0145657 A1    Jun. 11, 2009

(30) Foreign Application Priority Data
Jul. 25, 2005  (EP) .................. 05016096

(51) Int. Cl.
*H05K 7/14* (2006.01)
(52) U.S. Cl. .................. 174/535; 174/58; 29/428; 428/421
(58) Field of Classification Search .................. 174/535, 174/58, 61, 63, 137 R, 138 R, 113 C, 119 C; 29/248, 428; 428/421; 439/535
See application file for complete search history.

(56) References Cited

U.S. PATENT DOCUMENTS

| 4,217,466 | A | * | 8/1980 | Kuhl | 174/209 |
| 4,524,404 | A | * | 6/1985 | Verma | 361/132 |

FOREIGN PATENT DOCUMENTS

| DE | 1 814 498 A1 | 6/1970 |
| DE | 198 35 916 A1 | 2/2000 |
| GB | 2 058 482 A | 4/1981 |
| GB | 2 065 386 A | 6/1981 |
| GB | 1 598 951 A | 9/1981 |
| GB | 1 603 765 A | 11/1981 |
| JP | 11246726 A1 | 9/1999 |
| JP | 2005011797 A | 1/2005 |
| WO | WO 2004/105172 A1 | 12/2004 |

\* cited by examiner

Primary Examiner—Dhiru R Patel

(57) ABSTRACT

When an insulator is used in a humid atmosphere, the cooling thereof causes a humidity condensation, which is deposited on the insulator surface. Drops of water formed by the humidity condensation are connected to each other that a water film substantially reducing the insulation resistance of the insulator is formed. In order to solve said problem, the inventive insulator is provided, at least partially, with a hydrophobe surface. In such a way, the water layers formed by condensation are drained off the surface or detached there from without connection and the drops of water produced by condensation are unable to be bound to each other, thereby making it possible to maintain a desired high insulation resistance.

12 Claims, 2 Drawing Sheets

INSULATOR WITH ENHANCED INSULATING CAPACITY

CROSS REFERENCE TO RELATED APPLICATIONS

This application is the US National Stage of International Application No. PCT/EP2006/064562, filed Jul. 24, 2006 and claims the benefit thereof. The International Application claims the benefits of European application No. 05016096.9 filed Jul. 25, 2005, both of the applications are incorporated by reference herein in their entirety.

FIELD OF INVENTION

The invention relates to an insulator with enhanced insulating capacity as claimed in the claims.

BACKGROUND OF THE INVENTION

Insulators are generally used to secure, mount or support first current or voltage-carrying assemblies on or in second assemblies, such as housings, frames, supports, etc., when a current flow between the first current or voltage-carrying assembly and the second assembly is to be prevented.

For safety reasons a defined insulation resistance of the insulator must often be ensured in this process. For example in the case of an electrical device supported in a housing or vessel, e.g. in the case of a fuel cell module supported in a pressure vessel, a high insulation resistance must be ensured between the housing or vessel and the electrical terminals of the device. The electrically conducting parts of the device are therefore connected to the housing or vessel by way of insulators for securing, mounting or supporting purposes. In the case of some installations or devices the insulation resistance between the housing or vessel and the electrical terminals is permanently monitored and the installation or device is disconnected if the value of said insulation resistance drops below a limit value.

If insulators are in an environment where the temperature changes from hot to cold, as the environment cools moisture in the ambient atmosphere condenses and is deposited on the insulators. The deposited moisture forms water drops on the insulators and these join up to form a film of water wetting the surface. This produces electrically conducting water bridges assemblies to be insulated, which can cause the insulation resistance to be reduced by a factor of 10 or more for example.

For safety reasons the insulation sections are therefore generally designed to be so long that the sections of water do not significantly reduce the insulation resistance.

Further measures for preventing insulation resistances being too low are to prevent the condensation of moisture by drying the atmosphere with the aid of a drying facility or by not permitting operation of the device in the cold state.

SUMMARY OF INVENTION

On this basis the object of the present invention is to specify an insulator, which ensures a high insulation resistance even when used in changing ambient temperatures, without having to enlarge the insulation sections, provide additional drying facilities or apply operating restrictions.

According to the invention this object is achieved with an insulator as claimed in the claims. Advantageous embodiments are set out in the claims. Advantageous uses of the insulator are set out in the claims. An electrical facility with such an insulator is set out in the claims.

The hydrophobic surface of the insulator means that the condensed water drops either drain off the surface of the insulator or, if they do not drain off, remain individually on the surface without joining up with other water drops. It is thus possible to prevent a continuous water film and therefore a reduction of the insulation resistance in a reliable manner. This allows a high insulation resistance to be maintained even when the device cools causing the moisture to condense. It is thus possible to realize short insulation sections. There is no need to dry the atmosphere or disconnect for safety reasons during cooling.

According to an advantageous embodiment of the invention the insulator consists of an insulating, preferably non-hydrophobic, material with a hydrophobic surface coating. Since only the surface quality is important for the desired effect, the entire insulator does not have to consist of a hydrophobic material, instead a material that is optimal in respect of its mechanical and insulating properties for example and less optimal in respect of its hydrophobic properties (e.g. ceramic, plastic) can be selected for the insulator, said material being coated on its surface with an optimal material in respect of hydrophobic properties.

The surface coating preferably contains polytetrafluoroethylene (PTFE) as the hydrophobic material. This material is characterized by good adhesion to typical insulator materials such as ceramics or plastics and at the same time by good insulation resistance. Polytetrafluoroethylene can also be painted onto the insulator core in a simple manner in the form of a suspension, producing a thin surface layer after drying.

In a further advantageous embodiment of the invention the hydrophobic surface costing consists of a water-repellent material that can be dissolved in a solvent. In the dissolved state such a material can be applied very simply to the insulator core, for example by painting on, allowing particularly thin surface coatings to be produced.

The soluble hydrophobic material preferably consists wholly or partially of an amorphous fluoropolymer. Alternatively polysiloxane compounds or alkylsilanes are also suitable. These materials have both a good insulation resistance and good adhesion to a very wide range of insulator materials. In some instances only a corresponding surface treatment has to be carried out before coating. Of the amorphous fluoropolymers, amorphous Teflon modifications are particularly suitable. These materials can be covered with suitable solvents and diluted before use to an optimal concentration. The solution can then be applied using a standard application method such as spraying, wiping, painting, dipping, printing to the insulating, non-hydrophobic material, the solvent being evaporated and the remaining hydrophobic material being immobilized on the corrosion protection layer optionally by a temperature step at a higher temperature. Once the solvent has been evaporated, a very thin Teflon film remains on the surface of the insulator.

The inventive insulator is essentially highly suitable for the (insulated) supporting or securing of an electrical assembly in or on a housing, Examples of such are encapsulated electric motors, circuit breakers, power controllers or dry-type transformers. However it is particularly suitable for supporting electrical assemblies in a housing filled with moist gases to the dew point limit. This is the case for instance with a fuel cell module, supported in a pressure vessel.

The inventive insulator is also suitable for the (insulated) securing or mounting of a first electrically conductive assembly on a second assembly.

An inventive electrical facility comprises an electrical assembly, a housing and at least one insulator as claimed in one of claims 1 to 8 for mounting or securing the electrical assembly in or on the housing.

The electrical assembly is a fuel cell module, an electric motor, a switch, a power controller or a transformer, for example.

The housing preferably encloses the electrical assembly in a gas-tight and water-tight manner, so that on the one hand no water or gas can penetrate into the housing from the environment of the electrical facility or can be emitted from the housing to the environment.

The insulating properties of the insulator can be used in a particularly advantageous manner, if the housing consists of an electrically conductive material, such as a metal for instance. The housing can then not only protect the assembly against external influences, such as water for instance, but can also be used at the same time for EMC screening of the electrical assembly.

The high insulation resistance that can be achieved with the hydrophobic surface of the insulator can be used particularly advantageously, if the space between the housing and the electrical assembly is filed with a moist gas. It is then possible to realize comparatively short insulation sections between the housing and the electrical assembly, thereby keeping the electrical facility small and compact. This is the case in particular if the temperature of the moist gas drops below the dew point temperature of the gas during operation of the electrical facility, which would result in water condensing on the surface of the insulator.

The moist gas is preferably an inert gas or protective gas, for instance nitrogen.

If the moist gas is at a pressure greater than the pressure of a gas inside the electrical assembly, no gas can escape from the electrical assembly if there is a leak in the electrical assembly.

BRIEF DESCRIPTION OF THE DRAWINGS

The invention and further advantageous embodiments of the invention according to features of the subclaims are described in more detail below with reference to exemplary embodiments in the figures, in which:

DETAILED DESCRIPTION OF INVENTION

Figure 1:
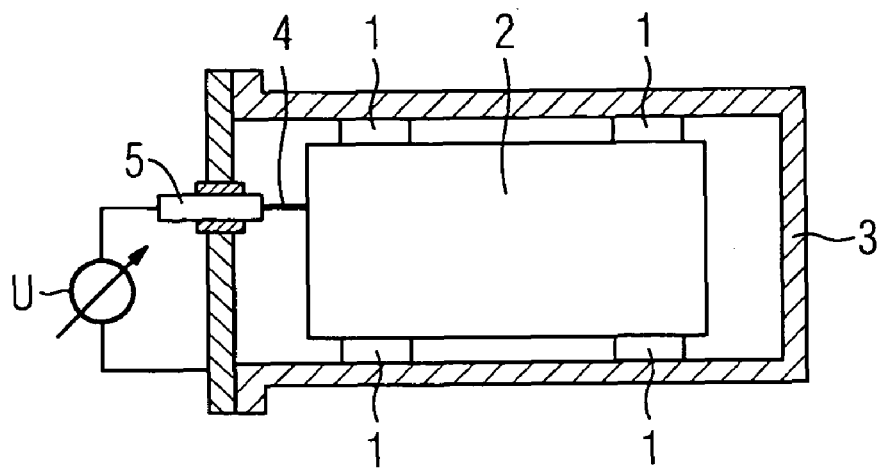
FIG. 1 shows a section through a fuel cell module with inventive insulators.

FIG. 1 shows a simplified section through an electrical facility consisting of a fuel cell module 2, supported in a pressure vessel or housing 3 by means of insulators 1. The pressure vessel or housing 3 encloses the fuel cell module 2 in a gas-tight and water-tight manner and serves to protect the fuel cell module against mechanical damage and/or ambient influences and to prevent the escape of operating gases from the fuel cell module to the ambient atmosphere. A power terminal 4 is guided out of the pressure vessel or housing 3 by way of a guide capacitor 5. For safety reasons there must be a high insulation resistance (generally 10 MΩ) between the pressure vessel or housing 3 and the electrical terminal 5. This insulation resistance is permanently monitored during operation of the fuel cell module in a fuel cell installation with the aid of a measuring voltage source U and the fuel cell installation is disconnected if the value of said insulation resistance drops below a limit value.

During operation of the fuel cell module 2 electrical energy, heat and pure water are produced from hydrogen and oxygen. Therefore during operation the fuel cell module 2 and the ambient atmosphere in the pressure vessel or housing 3 are warm and moist. Once the fuel cell module 2 has been disconnected, the fuel cell module cools and therefore so does the ambient atmosphere in the pressure vessel or housing 3 to a temperature below the dew point temperature, the moisture in the atmosphere condenses and is deposited on the surfaces of the insulators 1. The deposited moisture forms water drops on these surfaces and these join up to form a water film that wets the surface and would reduce the insulation resistance of the insulators 1 to 1 MΩ or less.

Figure 2:
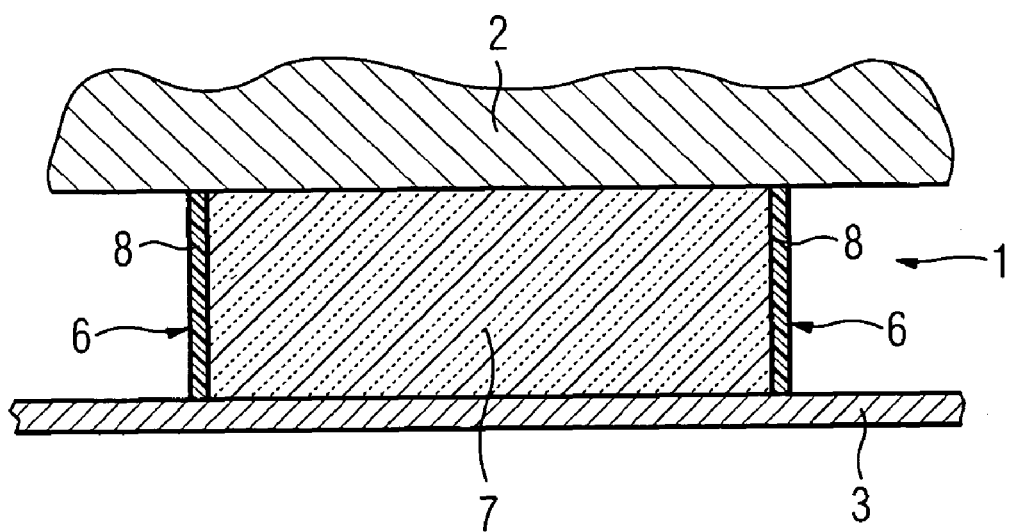
FIG. 2 shows an enlargement of one of the insulators from FIG. 1.

To prevent this, each of the insulators 1 features a hydrophobic surface 6 at the contact points with the pressure vessel atmosphere, as shown in detail in FIG. 2.

To this end the insulator 1 has a core 7 made of an insulating, preferably non-hydrophobic, material, e.g. a plastic or ceramic material, featuring a hydrophobic surface coating 8. The core 7 is hereby optimized in respect of the insulating and mechanical properties desired for the electrical facility (e.g. impact and vibration resistance).

The hydrophobic surface coating 8 preferably consists wholly or partially of a hydrophobic material that can be dissolved in a solvent. This material preferably consists of an amorphous fluoropolymer, in particular an amorphous Teflon modification (for example an amorphous copolymer of 65-99 mol % perfluoro-2,2-dimethyl-1,3-dioxol with a complementary quantity of tetrafluoroethylene, available from DuPont Fluoroproducts under the product name Teflon®AF).

Alternatively the surface coating 8 consists of a polysiloxane compound or of alkylsilanes, in particular alkyl-aryl-silanes or halogen-alkyl-aryl-silanes.

The surface coating 8 means that the condensed water drops do not join up to form a continuous water film but drain off or remain individually without joining up. It is therefore possible to maintain the desired high insulation resistance between the pressure vessel or housing 3 and the electrical terminals 5 even when the fuel cell module 2 cools and the moisture in the atmosphere in the pressure vessel or housing 3 condenses. It is therefore not necessary to dry the atmosphere in the pressure vessel or housing 3 or to disconnect the fuel cell module 2 for safety reasons during cooling.

A surface coating thickness in the range of nanometers to micrometers can be adequate for the hydrophobic surface coating to be effective. It is possible for example to achieve suitable layer thicknesses in the micrometer range with a PTFE suspension and even to achieve suitable layer thicknesses in the nanometer range with amorphous Teflon. The thickness must only be selected in such a manner that it is sufficiently water-repellent and is applied continuously in the region to be protected. The effectiveness of the coating can then be checked visually in a simple manner by wetting with pure water.

The invention has been described by way of example for a fuel cell module but the circumstances described apply equally to a plurality of electrical facilities with an electrical assembly, which is enclosed by a housing and supported in the housing or secured to the housing by means of insulators. These include in particular encapsulated electric motors, circuit breakers, power controllers or dry-type transformers.

Figure 3:
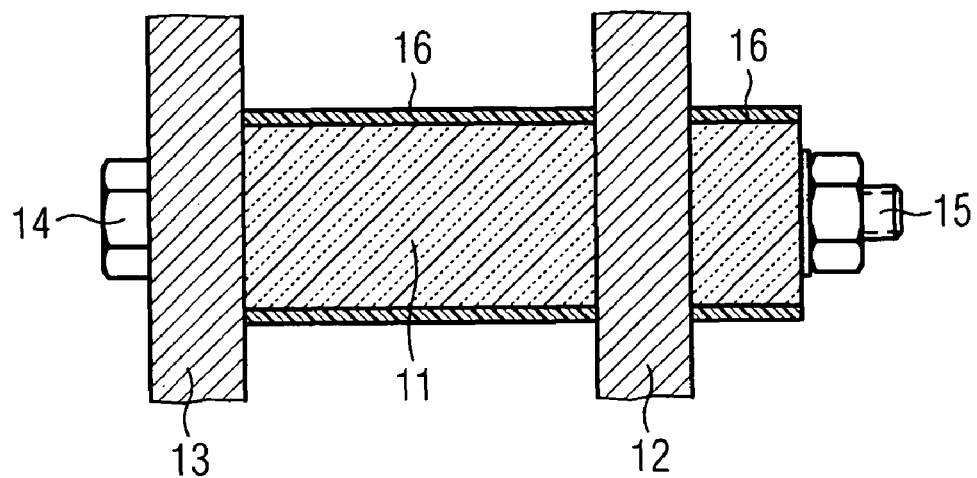
FIG. 3 shows the use of an inventive insulator for the mutual support of two current-carrying conductors and FIG. 4 shows the use of inventive insulators to secure overhead electric power lines.

FIG. 3 shows the use of inventive insulators 11 with hydrophobic surfaces 16 for securing and mutually supporting two electrical conductors 12, 13. The two conductors 12, 13 and the insulators 11 are pressed onto each other in the process by means of a screw connection 14, 15.

Figure 4:
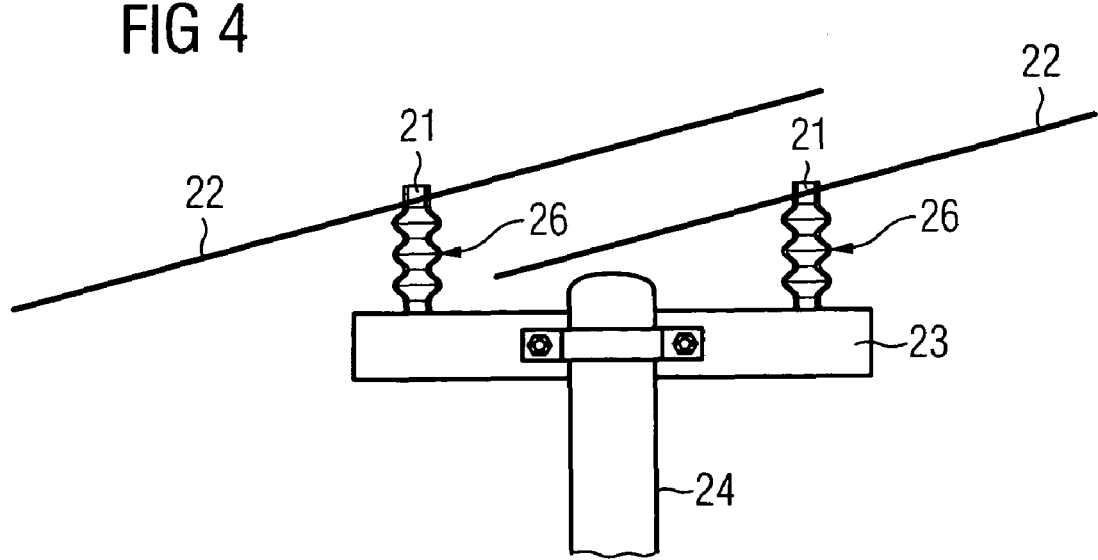

FIG. 4 shows a mounting for overhead electric power lines 22 using insulators 21 with hydrophobic surfaces 26 on a transverse support 23 of a roof pole 24.

The invention claimed is:

1. An insulator with enhanced insulating capacity, comprising:
   a non-hydrophobic material; and
   a hydrophobic surface coating at least partially surrounding the non-hydrophobic material with the hydrophobic surface coating consisting of a hydrophobic material that is dissolvable in a solvent, wherein the hydrophobic material consists at least partially of an amorphous fluoropolymer, which has been applied to the non-hydrophobic material in a dissolved state.

2. The insulator as claimed in claim 1, wherein the amorphous fluoropolymer is an amorphous polytetrafluoroethylene (TEFLON) modification.

3. The insulator as claimed in claim 2, wherein the hydrophobic surface coating has a thickness which is sufficiently water-repellent and is applied continuously in a region to be protected.

4. A process for supporting an electrical assembly in a housing, comprising:
   filling a housing with moist gas to a dew point limit; and
   supporting the electrical assembly within the housing with a hydrophobic material where the electrical assembly comprises:
      a non-hydrophobic material, and
      a hydrophobic surface coating at least partially surrounding the non-hydrophobic material with the hydrophobic surface coating consisting of a hydrophobic material that is dissolvable in a solvent, wherein the hydrophobic material consists at least partially of an amorphous fluoropolymer, which has been applied to the non-hydrophobic material in a dissolved state.

5. An electrical facility, comprising:
   a housing;
   an electrical assembly arranged in the housing; and
   an electrical insulator that secures the electrical assembly in the housing, wherein the insulator consists of a hydrophobic material that is dissolvable in a solvent, and the hydrophobic material consists at least partially of an amorphous fluoropolymer that has been applied to the non-hydrophobic material in a dissolved state.

6. The electrical facility as claimed in claim 5, wherein the housing is filled at least partially with a moist gas, where the moist gas is at the dew point.

7. The electrical facility as claimed in claim 6, wherein the housing encloses the electrical assembly in a gas-tight and water-tight manner.

8. The electrical facility as claimed in claim 7, wherein the housing consists of an electrically conductive material.

9. The electrical facility as claimed in claim 8, wherein a space between the housing and the electrical assembly is filled with the moist gas.

10. The electrical facility as claimed in claim 9, wherein during operation of the electrical facility comprising the electrical assembly in the housing, the temperature of the moist gas drops below the dew point of the moist gas.

11. The electrical facility as claimed in claim 10, wherein the pressure of the moist gas is greater than a pressure of a gas inside the electrical assembly.

12. The electrical facility as claimed in claim 11, wherein the electrical assembly is a fuel cell module, an electric motor, a switch, a power controller or a transformer.

* * * * *